(12) United States Patent
MacKay

(10) Patent No.: US 6,977,446 B2
(45) Date of Patent: Dec. 20, 2005

(54) MULTIPLE INVERTER POWER SYSTEM WITH REGARD TO GENERATOR FAILURE

(76) Inventor: Robin MacKay, 6626 Locklenna La., Rancho Palos Verdes, CA (US) 90275

(*) Notice: Subject to any disclaimer, the term of this patent is extended or adjusted under 35 U.S.C. 154(b) by 508 days.

(21) Appl. No.: 10/225,235

(22) Filed: Aug. 22, 2002

(65) Prior Publication Data
US 2004/0046458 A1 Mar. 11, 2004

(51) Int. Cl.⁷ .................................................. H02J 1/10
(52) U.S. Cl. ......................... 307/29; 307/23; 307/86
(58) Field of Search ........................ 307/18, 19, 20, 307/21, 23, 29, 64, 65, 68, 153, 85, 86, 80, 81, 125, 126, 130, 45, 47

(56) References Cited

U.S. PATENT DOCUMENTS

| 4,059,770 A | | 11/1977 | Mackay | |
|---|---|---|---|---|
| 4,575,640 A | * | 3/1986 | Martin | 307/23 |
| 6,023,135 A | | 2/2000 | Gilbreth et al. | |
| 6,031,294 A | | 2/2000 | Geis et al. | |
| 6,304,006 B1 | * | 10/2001 | Jungreis | 307/64 |
| 6,410,992 B1 | | 6/2002 | Wall et al. | |
| 6,465,910 B2 | * | 10/2002 | Young et al. | 307/64 |
| 6,476,519 B1 | * | 11/2002 | Weiner | 307/29 |

* cited by examiner

Primary Examiner—Brian Sircus
Assistant Examiner—Andrew Deschere
(74) Attorney, Agent, or Firm—Cislo & Thomas LLP

(57) ABSTRACT

The present invention is directed to a precise power system which utilizes two separate inverters fed by a rectifying power supply from a generator set. During normal operation, the first or critical inverter would feed the critical load(s) and the second or non-critical inverter would assist the electric utility in feeding the non-critical load(s). During utility grid failure, the second inverter is disconnected from the power supply so that the entire output of the generator set is available to the critical load. During generator set failure, the utility grid powers the second inverter to supply power to the first inverter for the critical load(s).

19 Claims, 4 Drawing Sheets

MULTIPLE INVERTER POWER SYSTEM WITH REGARD TO GENERATOR FAILURE

TECHNICAL FIELD

This invention relates to the general field of power systems and more particularly to a power system for a critical load.

BACKGROUND OF THE INVENTION

Many devices such as computers cannot tolerate even short interruptions in the supply of electricity or even slight deviations from rigid quality specifications for power. In addition, many manufacturing processes such as semiconductor fabrication have similar requirements. Power interruptions or poor quality power can result in loss of data, computers going off-line, damage to hardware, loss of in-process product, delayed product deliveries and other problems.

One solution has been to use generator sets that provide precise power to the critical loads and only to the critical loads. Thus, the power that has to be precise is isolated from utility problems such as switching transients, and lightning strikes as well as from in-house problems such as power surges or voltage dips caused by motor starting inrush. Generally this has meant the installation of what has been referred to as an "n+1" system. In other words, one more generator set than is necessary to meet the maximum load is installed. Thus, if a generator set fails, the remaining generator set(s) can still handle the load.

A major deficiency in "n+1" systems is the increase in capital cost due to the redundant generator set. Thus, if two generator sets can handle the load, three must be installed for roughly a 50% cost increase. A worse case occurs if one generator set can handle the load. Then the addition of a redundant generator set essentially doubles the cost of the system.

A second deficiency of an "n+1" system is that the generator sets do not operate at their full rating as they must always be prepared to increase power to handle the required load when a generator set fails. Indeed, if one generator set can handle the load and two are installed, the two generator sets must operate at no more than half of their rating if they are to be able to pick up the full load when a generator set fails. With conventional single shaft, gas turbine-driven generator sets (turbogenerators), this has meant a dramatic decrease in fuel efficiency. Correspondingly, small turbogenerators or microturbines must operate at much higher speeds than is optimum for efficiency if they are going to be able to assume the increased load when a generator set fails.

U.S. Pat. No. 4,059,770, issued on Nov. 22, 1977 to Robin Mackay entitled "Uninterruptible Electric Power Supply" describes a concept which uses a prime mover to drive two synchronous generators simultaneously through an overrunning clutch, and is incorporated herein by reference. The first or critical generator would be connected to the critical load and provide precise power to it while always matching exactly the demand of the critical load. The second or non-critical generator would be paralleled with the utility and assist the utility in providing power to the non-critical loads. It would provide a varying amount of power to the non-critical loads such that the total load of both generators would be fixed and match the rating of the prime mover. Thus, if the critical generator experienced a rapid change in load through a change in the load on the critical buss or a failure of a paralleled generator set, the prime mover would not see a step load. It would continue to drive the generators at a fixed speed maintaining a constant frequency.

Correspondingly, if the prime mover in the concept of U.S. Pat. No. 4,059,770 failed, the generator that is connected to the utility grid would instantly become a motor and drive the generator that is feeding the critical loads. The prime mover would instantly disconnect itself from the generators through the action of an overrunning clutch.

There are several advantages to this system over an "n+1" system. First, the redundant generator set is eliminated reducing first cost. Second, the prime mover operates at its full rating which increases its efficiency. Third, because the generator set operates at its full rating, more power is generated reducing the capital cost per kWh element in the cost of producing electricity. Fourth, because the output of the prime mover does not change as the critical loads change, there is no problem with positive or negative step loads.

While the concept of U.S. Pat. No. 4,059,770 has these advantages with respect to turbogenerators generally, small turbogenerators or microturbines present a different problem statement. The vast majority of microturbines in the field today consist of modest sized gas turbines that drive generators that operate at the same speed as the gas turbine. These very high-speed generators operate in the range of 96,000 rpm to produce power at very high frequencies, typically 1600 Hz. As this frequency is too high for most applications, a power conditioning system is needed. The generator output is rectified to direct current and then inverted to conventional frequencies such as 50 Hz or 60 Hz.

For precise power using microturbines, an "n+1" system has traditionally been used with the disadvantages discussed above. Although the concept of driving two generators simultaneously, as proposed in U.S. Pat. No. 4,059,770, is theoretically possible, it is totally impractical because of the very high speeds.

An alternate concept more specifically directed to microturbines is described in U.S. Pat. No. 6,031,294, issued on Feb. 29, 2000 to Everett R. Geis, Brian W. Peticolas and Joel B. Wachnov entitled "Turbogenerator/Motor Control System with Ancillary Energy Storage/Discharge" and incorporated herein by reference. In that patent, an alternate source of power such as batteries can be used either to provide additional power to the direct current buss during increasing loads or to absorb power during decreasing loads.

Although technically sound, this concept increases the cost of the system as well as the space required, as the most practical source of additional power is batteries. Batteries are expensive, bulky, and require both regular maintenance and regular replacement. In addition, the gas turbines still operate at reduced load, as there must be margin to handle increasing loads or potential overloads. This impacts the efficiency as well as reducing the total amount of power that the gas turbine could produce thus increasing the capital cost per kWh generated. Most important, in the event of a gas turbine failure or a fuel supply failure, the system would go down as soon as the energy storage device (battery) was exhausted.

SUMMARY OF THE INVENTION

The present invention is directed to a precise power system which utilizes two separate inverters fed by a rectifying power supply from a generator set. During normal operation, the first or critical inverter would feed the critical load(s) and the second or non-critical inverter would assist the electric utility in feeding the non-critical load(s). During utility grid failure, the second inverter is disconnected from the power supply so that the entire output of the generator set is available to the critical load. During generator set failure, the utility grid powers the second inverter to supply power to the first inverter for the critical load(s).

BRIEF DESCRIPTION OF THE DRAWINGS

Figure 1:
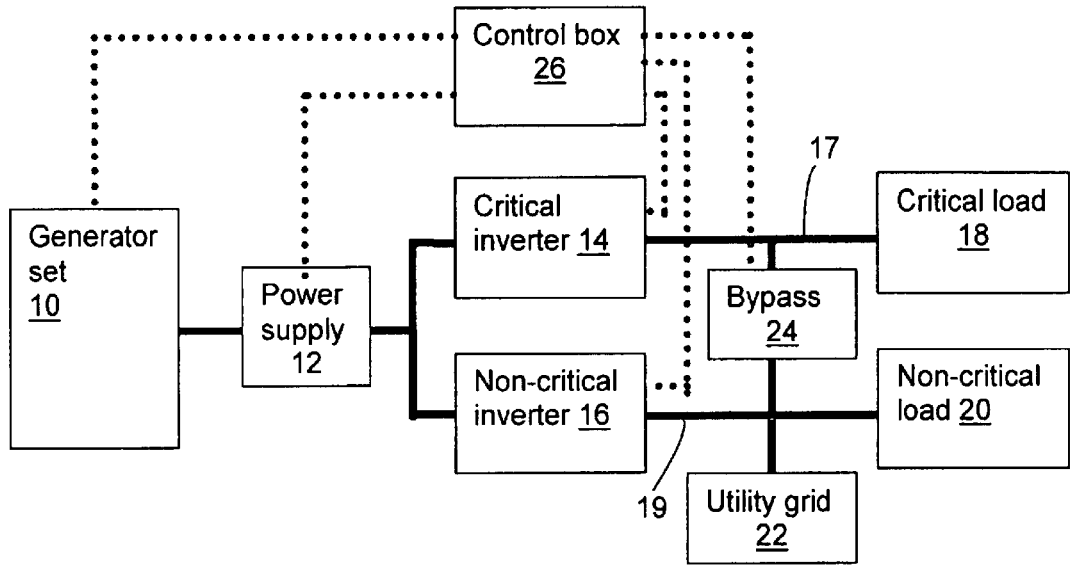
Figure 2:
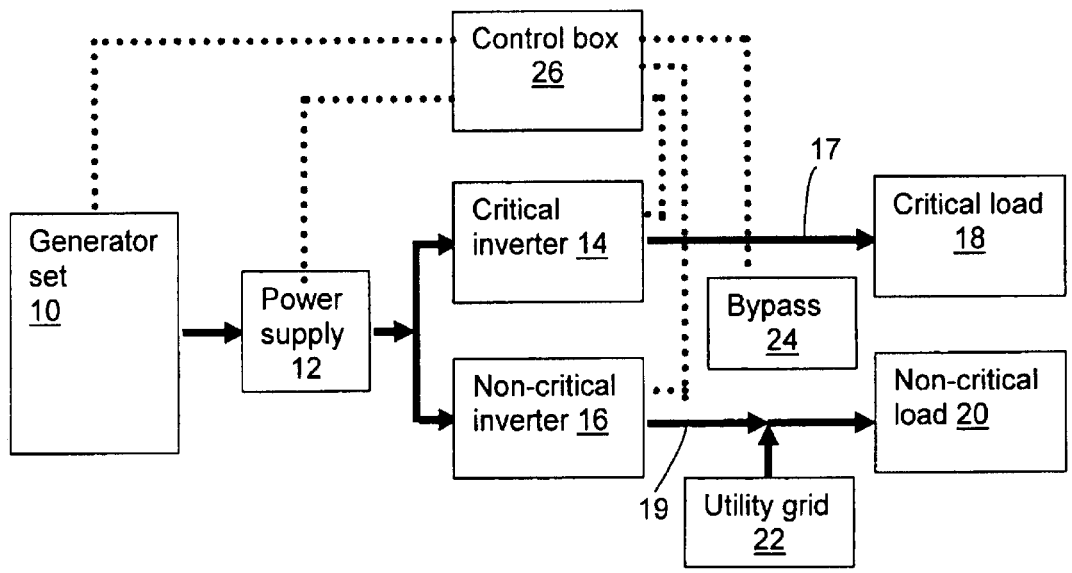
Figure 3:
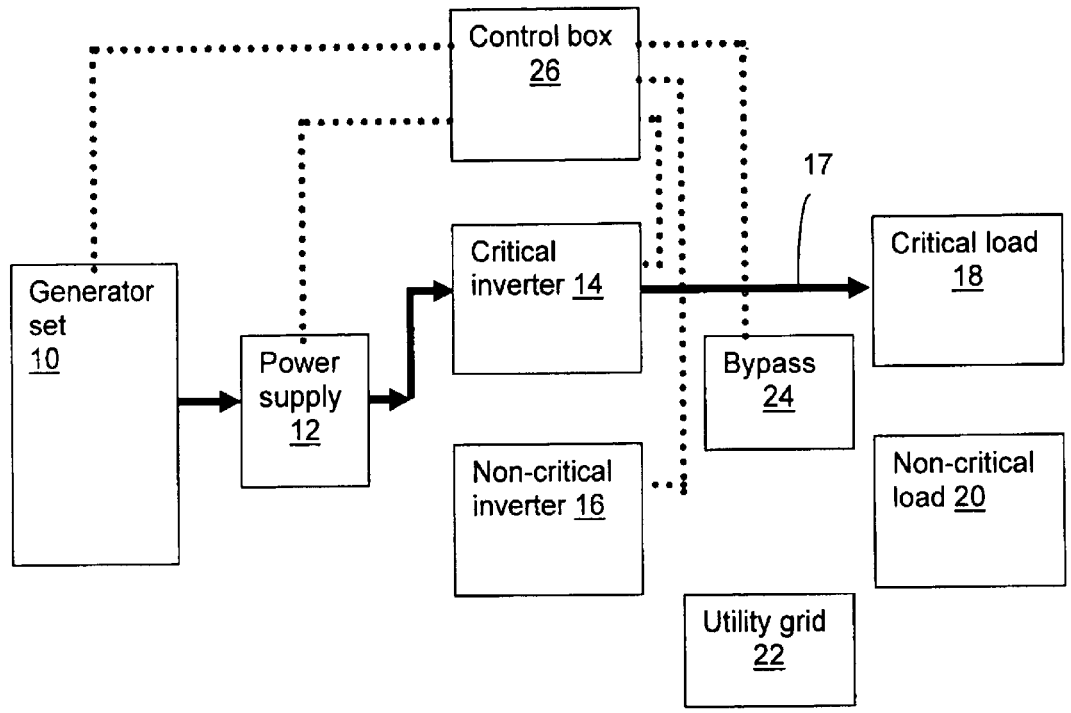
Figure 4:
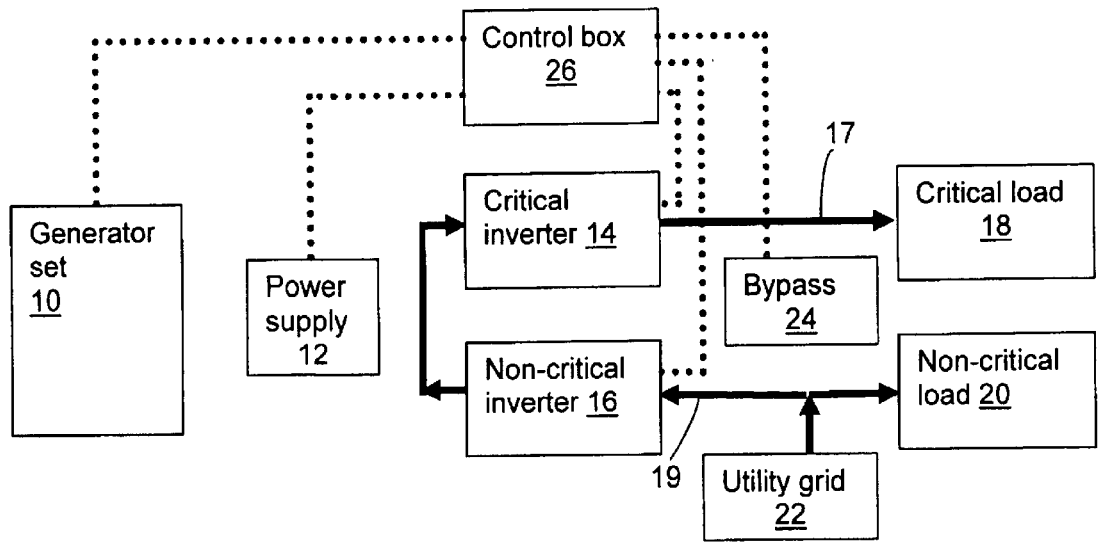
Figure 5:
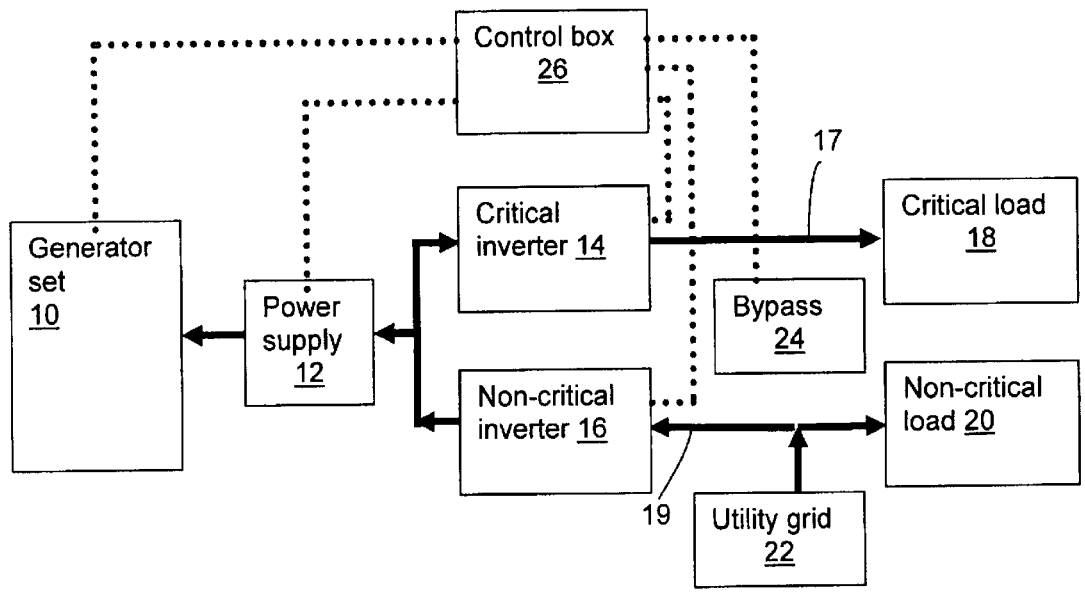
Figure 6:
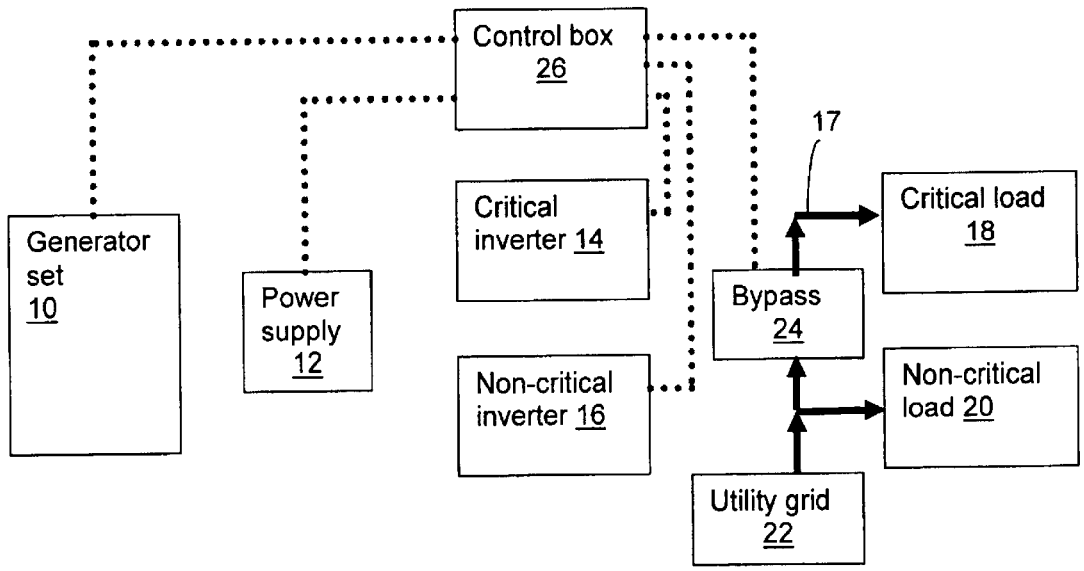
Figure 7:
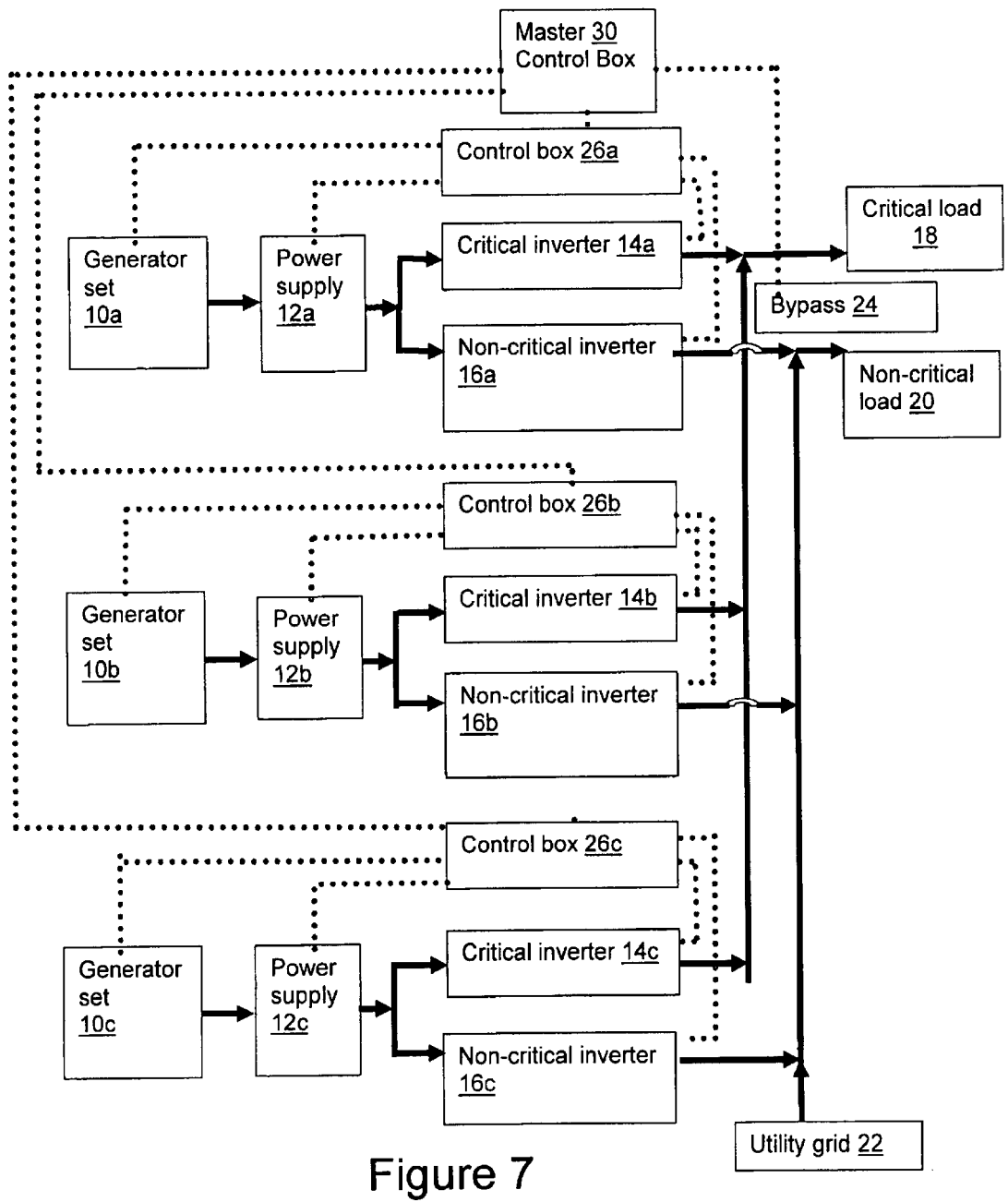

Having thus described the present invention in general terms, reference will now be made to the accompanying drawings in which:

FIG. 1 is a schematic block diagram of the precise power system of the present invention;

FIG. 2 is a schematic block diagram of the precise power system of the present invention during normal operation;

FIG. 3 is a schematic block diagram of the precise power system of the present invention during a utility grid failure;

FIG. 4 is a schematic block diagram of the precise power system of the present invention during a generator set failure;

FIG. 5 is a schematic block diagram of the precise power system of the present invention during a generator set restart;

FIG. 6 is a schematic block diagram of the precise power system of the present invention during system isolation; and FIG. 7 is a schematic block diagram of a multi generator set precise power system of the present invention.

DETAILED DESCRIPTION OF THE PREFERRED EMBODIMENTS

FIG. 1 illustrates the various elements of the precise power system with the power connections shown in heavy solid lines and the wiring connections shown in light dotted lines. In the remaining figures, only the power connections which are transmitting power are shown, and they are shown in heavy solid lines with arrowheads to indicate the direction of power flow.

The generator set, such as a gas turbine generator set or microturbine 10 is electrically connected to a rectifying power supply 12 which in turn is electrically connected both to a critical inverter 14 and a non-critical, bi-directional, inverter 16. The critical inverter 14 is electrically connected to critical load 18 by buss 17 while non-critical, bi-directional, inverter 16 is electrically connected to non-critical load 20 by buss 19. The utility grid 22 is electrically connected to non-critical buss 19 and through switching bypass 24 to critical buss 17. The control box 26 provides and/or supplies signals to/from gas turbine generator set 10, power supply 12, critical inverter 14, non-critical inverter 16 and bypass 24.

The normal operation of the precise power system is illustrated in FIG. 2. The fuel control of the gas turbine generator set 10 is set in grid-parallel mode and provides a fixed amount of fuel and therefore a fixed amount of power from the generator set 10. This is the most common mode of operation for any generator set operating in parallel with the utility grid 22. Generally, the setting would match the maximum continuous power specified by the manufacturer for specific conditions such as altitude and inlet temperature noting that changes in conditions might change this fuel setting. Most gas turbines would therefore operate at their most efficient power setting and achieve the maximum possible load factor.

The rectifying power supply 12 would receive power from the gas turbine generator set or microturbine 10 and after rectifying the power would transmit the power to both critical inverter 14 and non-critical, bi-directional, inverter 16. The critical inverter 14 would operate in stand-alone mode providing high quality power to the critical load 18. The output of this inverter 14 would follow the load as the critical load 18 changes. The output would be isolated from electrical problems on the non-critical buss 19. The non-critical inverter 16 would operate in grid-parallel mode providing power to the non-critical load 20 in conjunction with power from the utility grid 22. This inverter power would reduce the amount of power being purchased from the electric utility or in rare cases feed power back into the utility grid 22.

As the power output of the gas turbine generator set is fixed, the total power produced by the two inverters 14, 16 would also be fixed. Thus, if the critical load 18 increases, the power delivered to the non-critical buss 19 by the non-critical, bi-directional, inverter 16 would decrease and vice versa. This would happen automatically using signals from current transformers on the gas turbine generator set output and on both of the inverter outputs. The output of the non-critical inverter 16 would be adjusted to match the output of the generator set 10 minus the output of the critical inverter 14 with appropriate corrections for efficiencies and any parasitic losses. This is similar to the control techniques used by any microturbine paralleled with the utility as generally described in U.S. Pat. No. 6,023,135, issued Feb. 8, 2000 to Mark G. Gilbreth, James Brian Dickey, Charles R. Gilbreth, Jr. and Edward C. Edelman entitled "Turbogenerator/Motor Control System", and incorporated herein by reference. This patent demonstrates that it is common practice to use bi-directional inverters for both the rectifying power supply and the output inverter. In applications where the output is to be paralleled with the utility grid, this permits the power conditioning system to operate in reverse when the gas turbine is to be started. Thus, utility power can be rectified to direct current by what would normally be the output inverter. Correspondingly, what would normally be the rectifying power supply can then invert the direct current and provide alternating current to the gas turbine's generator that now becomes the starter motor.

Microturbines like conventional generator sets can usually operate in two separate modes. They can parallel with the utility grid and deliver a fixed amount of electricity to the utility buss. They can also operate in a stand-alone mode in which case the amount of electricity that they deliver matches the load that they are supplying and varies as the load changes. The control mechanisms for these modes are discussed in U.S. Pat. Nos. 6,031,294 and 6,023,135.

FIG. 3 illustrates the operation of the precise power system during a utility grid power failure. If the utility grid 22 fails, the non-critical inverter 16 would disengage from supplying power to the non-critical load 20. This would reduce the load on the gas turbine generator set 10. The gas turbine generator set fuel control would change from fixed power or grid-parallel mode to stand-alone mode and act as a conventional generator set does when operating in stand-alone mode and not paralleled with the utility grid 22. The only load on the system would be the critical load 18, as the non-critical inverter 16 would no longer be providing power to the non-critical buss 19. The gas turbine generator set 10 would then load-follow the critical load 18 and provide high quality power. When utility grid power was restored, the non-critical inverter 16 would again parallel with the utility grid 22 using conventional techniques. The gas turbine generator set fuel control would revert to fixed power and normal operation would resume.

FIG. 4 shows the operation of the precise power system if the gas turbine generator set 10 were to fail or if the fuel supply were to fail. The gas turbine generator set 10 would stop and would cease to produce power. Then the bi-directional non-critical inverter 16 would reverse its function; instead of taking power from the power supply 12 and delivering alternating current to the non-critical buss 19, it would take power from the utility grid 22 and power the critical inverter 14. Thus, the critical inverter 14 would operate in stand-alone mode and continue to provide quality power to the critical load 18 without interruption. The critical load 18 would still be isolated from utility or in house electrical problems. As soon as the gas turbine generator set 10 could be restarted, normal operation would resume.

The operation of the precise power system during restarting of the gas turbine generator set 10 is illustrated in FIG. 5. Power from the utility grid 22 is rectified to direct current in the non-critical inverter 16 and then inverted back to variable frequency, variable voltage current in the power supply 12. This power is used to start the gas turbine with the generator acting as a starter motor. This is common practice for starting microturbines where utility power is available. If utility power is not available, batteries can provide power to the direct current buss and the power supply 12 can provide the appropriate power to start the gas turbine. This is common practice for starting microturbines where utility power is not available.

FIG. 6 illustrates the precise power system being bypassed as might be necessary during system maintenance or system failure. Note that during normal operation, the critical inverter 14 would operate in phantom parallel with the utility grid 22. In other words, the frequency and phase of the output of the critical inverter 14 would be identical to that of the utility grid 22. Thus, in the event of a complete system failure, the critical load 18 could be transferred to the utility grid 22 without interruption. This transfer could be facilitated by the use of static switches in the bypass 24.

This precise power system has a number of significant advantages over the "n+1" system previously described in the Background of the Invention. It is less expensive to buy because one gas turbine generator set is eliminated. It is more fuel-efficient as the gas turbine operates at higher loads. The utilization is higher because of the additional power delivered by the non-critical inverter. The power delivered to the non-critical buss reduces the electric utility bill. Finally, the system offers additional reliability in that it can operate from either of two energy sources—fuel from pipelines or storage, or electricity from the utility.

The above description assumes that the precise power system is based on a single microturbine powering a single power supply which in turn powers two inverters, one for the critical load and one for the non-critical buss. It should be recognized, however, that there are numerous microturbine installations utilizing multiple microturbines in which the electrical output from their inverters is paralleled. Correspondingly, it is feasible to use multiple microturbines and parallel the critical inverters to feed the critical loads while paralleling the non-critical inverters to feed the non-critical buss.

FIG. 7 shows a multiple unit installation, shown for purposes of illustration as three. Essentially, however, any number of units could be paralleled. A single switching bypass 24 is shown which connects the utility grid 22 to the critical load 18 in the event of a system failure or if system maintenance is required. Each microturbine 10a, 10b, and 10c would include an individual power supply 12a, 12b, and 12c, critical inverter 14a, 14b, and 14c, non-critical inverter 16a, 16b, and 16c, and control box 26a, 26b, and 26c. A master control box 30 can provide signals between individual control boxes 26a, 26b, and 26c and bypass 24. While a single bypass 24 is illustrated, each unit a, b, and c can have individual switching bypasses which would generally act simultaneously.

While specific embodiments of the invention have been illustrated and described, it is to be understood that these are provided by way of example only and that the invention is not to be construed as being limited thereto but only by the proper scope of the following claims.

What I claim is:

1. A method of supplying uninterruptible electrical power to a critical load and electrical power to a non-critical load, comprising:

providing a critical inverter for the critical load;

providing a functionally separate non-critical inverter for the non-critical load;

during normal operation, supplying electrical power from a generator set to both said critical inverter and said non-critical inverter through a rectifying power supply, and supplying electrical power from a utility grid to said non-critical load;

during utility grid failure, disconnecting the non-critical inverter from the rectifying power supply so as to provide the entire power output from the generator set to the critical inverter through the rectifying power supply; and during generator set shut down, providing utility grid power to said non-critical inverter to supply power to said critical inverter for the critical load.

2. A method of supplying uninterruptible electrical power to a critical load and electrical power to a non-critical load, comprising:

providing a critical inverter dedicated to the critical load;

providing a non-critical, bi-directional, inverter for the non-critical load;

during normal operation, supplying electrical power from a turbogenerator to both said critical inverter and said non-critical, bi-directional, inverter through a rectifying power supply, and supplying electrical power from a utility grid to said non-critical load;

during utility grid failure, disconnecting said non-critical, bi-directional, inverter from the rectifying power supply so as to provide the entire power output from the turbogenerator to the critical inverter through the rectifying power supply; and during turbogenerator shutdown, providing utility grid power to said non-critical, bi-directional, inverter to supply power to said critical inverter for the critical load.

3. A method of supplying uninterruptible electrical power to a critical load and electrical power to a non-critical load, comprising:

providing a first inverter dedicated to the critical load;

providing a second inverter for the non-critical load;

during normal operation, supplying electrical power from a microturbine to both said first inverter and said second inverter through a rectifying power supply, and supplying electrical power from a utility grid to said non-critical load;

during utility grid failure, disconnecting the second inverter from the rectifying power supply so as to provide the entire power output from the microturbine to the first inverter through the rectifying power supply; and during microturbine shut down, providing utility grid power to said second inverter to supply power to said first inverter for the critical load.

4. The method of supplying uninterruptible electrical power to a critical load and electrical power to a non-critical load of claim 3, and in addition:

providing means to start the microturbine with power from the utility grid rectified to direct current in the second inverter and inverted back to variable frequency, variable voltage, current in the power supply.

5. The method of supplying uninterruptible electrical power to a critical load and electrical power to a non-critical load of claim 3, and in addition:

providing a switching bypass between the critical load and the non-critical load to isolate the critical load and the non-critical load with the utility grid during system maintenance or system failure.

6. A method of supplying uninterruptible electrical power to a critical load and electrical power to a non-critical load, comprising:

providing a plurality of critical inverters each dedicated to the critical load;

providing a like plurality of non-critical, bi-directional, inverters for the non-critical load;

during normal operation, supplying electrical power from a like plurality of turbogenerators to both said plurality of critical inverters and said plurality of non-critical, bi-directional, inverters through a like plurality of rectifying power supplies, and supplying electrical power from a utility grid to said non-critical load;

during utility grid failure, disconnecting at least one of said plurality of non-critical, bi-directional, inverters from the corresponding rectifying power supply of said plurality of rectifying power supplies so as to provide the entire power output from the corresponding turbogenerator of said plurality of turbogenerators to the corresponding critical inverter of said plurality of critical inverters through the corresponding rectifying power supply of said plurality of rectifying power supplies; and during shutdown of any of said plurality of turbogenerators, providing utility grid power to said corresponding non-critical, bi-directional, inverter of said plurality of non-critical, bi-directional, inverters to supply power to said corresponding critical inverter of said plurality of critical inverters for the critical load.

7. The method of supplying uninterruptible electrical power to a critical load and electrical power to a non-critical load of claim 6, and in addition:

providing means to start each of said plurality of turbogenerators with power from the utility grid rectified to direct current in the corresponding non-critical, bi-directional inverter of said plurality of non-critical, bi-directional inverters and inverted back to variable frequency, variable voltage, current in the corresponding rectifying power supply of said plurality of rectifying power supplies.

8. The method of supplying uninterruptible electrical power to a critical load and electrical power to a non-critical load of claim 6, and in addition:

providing a switching bypass between the critical load and the non-critical load to isolate the critical load and the non-critical load with the utility grid during system maintenance or system failure.

9. The method of supplying uninterruptible electrical power to a critical load and electrical power to a non-critical load of claim 6, and in addition:

providing a like plurality of switching bypasses between the critical load and the non-critical load to act simultaneously to isolate the critical load and the non-critical load with the utility grid during system maintenance or system failure.

10. A precise power system, comprising:

a critical load;

a non-critical load;

a critical inverter providing electrical power to said critical load during normal operation;

a non-critical, bi-directional, inverter providing electrical power to said non-critical load during normal operation;

a generator set;

a rectifying power supply receiving electrical power from said generator set and supplying rectified electrical power to both said critical inverter and said non-critical, bi-directional, inverter during normal operation;

a utility grid for supplying electrical power to said non-critical load during normal operation;

means for said rectifying power supply to provide electrical power from said generator set only to said critical inverter during utility grid shutdown; and means for said non-critical, bi-directional, inverter to supply electrical power from said utility grid to said critical inverter during said generator set shutdown.

11. The precise power system of claim 10, and in addition, means to start said generator set with power from said utility grid rectified to direct current in said non-critical, bi-directional, inverter and inverted back to variable frequency, variable voltage, current in said rectifying power supply.

12. The precise power system of claim 10 wherein said generator set is a turbogenerator.

13. The precise power system of claim 12 wherein said turbogenerator is a microturbine.

14. The precise power system of claim 10, and in addition, a switching bypass disposed between said critical load and said non-critical load to isolate said critical load and said non-critical load with said utility grid during system maintenance or system failure.

15. A precise power system, comprising:

a critical load;

a non-critical load;

a plurality of critical inverters providing electrical power to said critical load during normal operation;

a like plurality of non-critical, bi-directional, inverters providing electrical power to said non-critical load during normal operation;

a like plurality of generator sets;

a like plurality of rectifying power supplies each receiving electrical power from said corresponding generator set of said like plurality of generator sets and supplying rectified electrical power to both said corresponding critical inverter of said plurality of critical inverters and said corresponding non-critical, bi-directional, inverter of said plurality of non-critical, bi-directional, inverters during normal operation;

a utility grid for supplying electrical power to said non-critical load during normal operation;

means for each of said rectifying power supplies of said plurality of rectifying power supplies to provide electrical power from said corresponding generator set of said plurality of generator sets only to said corresponding critical inverter of said plurality of critical inverters during utility grid shutdown; and means for each of said non-critical, bi-directional, inverters of said plurality of non-critical, bi-directional, inverters to supply electrical power from said utility grid to said corresponding critical inverter of said plurality of critical inverters during said corresponding generator set shutdown.

16. The precise power system of claim 15 wherein said like plurality of generator sets is a like plurality of turbogenerators.

17. The precise power system of claim 16 wherein said like plurality of turbogenerators is a like plurality of microturbines.

18. The precise power system of claim 15, and in addition, at least one switching bypass disposed between said critical load and said non-critical load to isolate said critical load and said non-critical load with said utility grid during system maintenance or system failure.

19. The precise power system of claim 18 wherein said at least one switching bypass is a like plurality of switching bypasses acting simultaneously.

* * * * *